UNITED STATES PATENT OFFICE 2,591,699

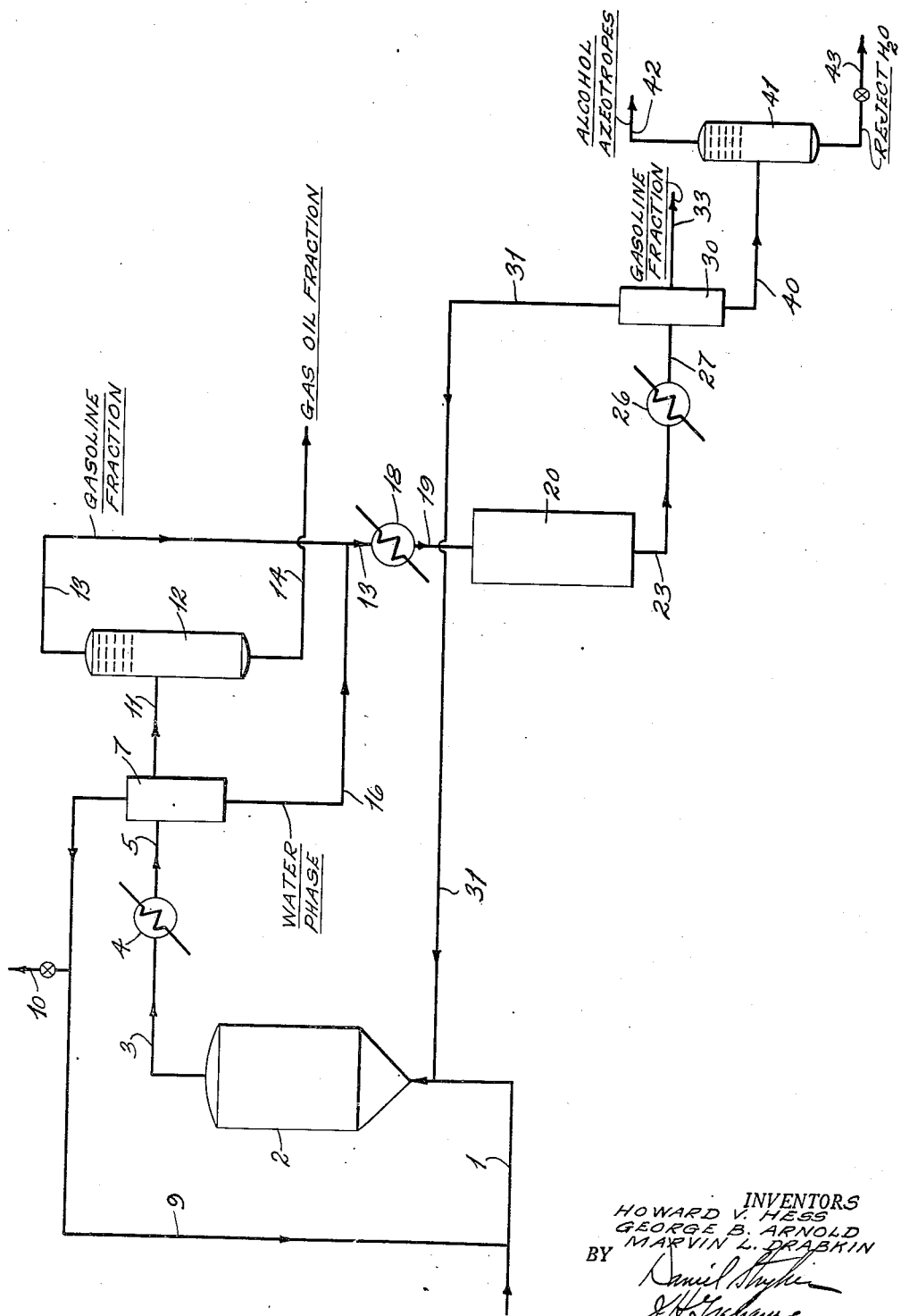

VAPOR PHASE TREATMENT OF COMBINED GASOLINE AND WATER PHASES OF SYNTHESIS PRODUCT WITH A BASIC COMPOUND

Howard V. Hess, Beacon, and George B. Arnold, Glenham, N. Y., and Marvin L. Drabkin, Pittsburgh, Pa., assignors to The Texas Company, New York, N. Y., a corporation of Delaware Application November 14, 1949, Serial No. 127,201

9 Claims. (Cl. 260—450)

This invention relates to a method for treating the product obtained by the catalytic conversion of carbon monoxide and hydrogen into synthetic fuel.

This invention is a continuation-in-part of Serial No. 68,463 filed December 31, 1948, which discloses a process for treating the entire liquid phase of synthesis product in the vapor state at an elevated temperature of at least 500° F. with a basic compound of an alkaline metal or of an alkaline earth metal or mixtures thereof. Vapor phase basic treatment of the entire liquid product results in hydrolysis of esters to alcohols and acids and in the decarboxylation of acids either to hydrocarbons or ketones. In the subject continuation-in-part a composite consisting of the gasoline fraction and the water phase of synthesis product is subjected to vapor phase treatment with a basic compound since it has been discovered that improved results are thereby obtained.

In accordance with the method of this invention, the product obtained by the catalytic conversion of carbon monoxide and hydrogen into synthetic fuel is separated into a gas phase, a water phase and an oil phase. Advantageously, separation of the synthesis product into the aforementioned component phase is effected at an elevated temperature of about 200 to 400° F. and at a pressure of about 150 to 500 pounds per square inch. The gas phase in whole or in part is recycled to the reaction zone wherein carbon monoxide and hydrogen are converted into liquid hydrocarbons. After separation of the oil phase into a gasoline fraction having an E. P. of about 400° F. and into a gas oil fraction comprising the remainder of oil phase, the gasoline fraction is combined with the water phase. The composite of gasoline fraction and water phase is vaporized and contacted in the vapor state at an elevated temperature of at least 500° F. with a basic compound of an alkali metal or of an alkaline earth metal or with mixtures of such basic compounds. Treatment of the combined gasoline fraction and water phase in the vapor state with a compound selected from the aforedescribed group results in hydrolysis of water-soluble esters and oil-soluble esters boiling in the gasoline fraction to alcohols and acids and in decarboxylation of water-soluble acids and oil-soluble acids boiling in the gasoline range either to hydrocarbons or ketones. After contacting the combined gasoline fraction and water phase in the vapor state with a basic compound, the composite is cooled and separated into a gaseous fraction, a water phase and a gasoline phase.

The gaseous fraction obtained on cooling and separation of the base-treated composite is recycled in whole or in part to the reaction zone wherein carbon monoxide and hydrogen are converted into synthetic fuel. As an alternative procedure, this gaseous fraction can be sent to a poly plant for polymerization into higher molecular weight hydrocarbons. Aqueous azeotropes of alcohols, ketones and hydrocarbons are separated from the water phase; flashing provides a convenient method for removing aqueous azeotropes from the water phase. The gasoline fraction is readily freed from oxygenates which are mainly in the form of alcohols by solvent extraction or silica gel adsorption.

Catalytic conversion of carbon monoxide and hydrogen into synthetic fuel by contact with a fluidized iron catalyst at an elevated temperature of 500 to 750° F. and at a pressure of 100 to 500 pounds per square inch results in the formation of a product comprising a gas phase and a liquid phase, the latter consisting of approximately one part oil phase and 2 parts water phase. Oxygen-containing organic compounds, such as, alcohols, acids, esters, ketones, and aldehydes are distributed throughout the two phase liquid product; the molecular weight of the oxygen-containing compounds determines whether they are primarily found in the water phase or in the oil phase. The oxygen-containing organic compounds ordinarily found in the water phase comprise lower molecular weight compounds, such as, $C_1$ to $C_6$ alcohols, esters containing up to about 4 carbon atoms and $C_2$ to $C_6$ organic acids with traces of the higher molecular weight compounds. The oxygen-containing organic compounds ordinarily found in the oil phase comprise higher molecular weight compounds, such as, $C_4$ and higher alcohols, esters containing more than 3 carbon atoms and $C_3$ and and higher organic acids with traces of the lower molecular weight compounds. It will be noted that there is considerable overlapping in the distribution of the oxygen-containing compound between the oil and water phases. This overlapping is due to the fact that compounds of intermediate molecular weights, such as, $C_5$ alcohols are found in substantial proportion in both oil and water phases.

The disposal of the water phase in large scale commercial operation poses a serious problem since the oxygen-containing organic compounds comprise as high as 20 per cent of the water phase and their presence therein would seriously pollute any stream or river into which the water phase is dumped. The oxygen-containing organic compounds present in both the oil and water phases are valuable chemicals in their own right and are in high demand as chemicals of commerce. The subject invention provides a method for expediting the recovery of oxygen-containing organic compounds from both the oil and water phases and also purifies the water phase to such an extent that it can be poured into rivers and streams without fear of polluting them.

The liquid product, consisting of oil and water phases, obtained by the catalytic conversion of carbon monoxide and hydrogen into liquid hydrocarbons by contact with a fluidized iron catalyst at an elevated temperature of 500 to 750° F. and at a pressure of 100 to 500 pounds per square inch contains approximately 15 to 25 per cent oxygen-containing organic compounds. The distribution of the various types of oxygen-containing organic compounds in this 15 to 25 per cent fraction of product is best illustrated by considering the concentration of the oxygen-containing organic compounds in the oil and water phases obtained by separation of the liquid product at atmospheric conditions. The aqueous phase separated from the liquid phase at atmospheric conditions contains approximately 20 per cent oxygen-containing organic compounds which are distributed among the various oxygen-containing organic compounds approximately as follows: 12 per cent alcohols, 3 per cent acids, 3 per cent esters, 1 per cent aldehydes, 1 per cent ketones. The oil phase separated from the liquid product at atmospheric conditions, contains approximately 13 per cent oxygen-containing organic compounds which are distributed among the various types of organic compounds as follows: 7 per cent alcohols, 2 per cent acids, 2 per cent esters, 1 per cent aldehydes, and 1 per cent ketones. It will be noted that alcohols form the major portion of the oxygen-containing organic compounds in both the water and oil phases; acids and esters are also present in the oil and water phases in a substantial portion, whereas aldehydes and ketones constitute a relatively small fraction of both the water and oil phases.

The gasoline fraction having an E. P. of 400° F., which is obtained by separation of the synthesis product into oil and water phases at a temperature between 200 and 400° F. and a pressure of from 150 to 500 pounds per square inch and by fractionation of the oil phase so obtained into a gasoline fraction having an E. P. of 400° F. and a residual gas oil fraction, contains approximatelly 6 per cent alcohols, 3 per cent acids, 5 per cent esters, 1 per cent aldehydes and 1 per cent ketones.

Treatment of the combined gasoline fraction and oil phase at an elevated temperature in the vapor state with a basic compound and the type previously described, hydrolyzes esters to alcohols and acids and dicarboxylates acids initially present and acids formed by ester hydrolysis. Water-soluble esters and oil-soluble esters boiling in the gasoline range are both efficiency hydrolyzed. In similar fashion, both water-soluble acids and oil-soluble acids boiling up to 400° F. are decarboxylated with about equal efficiency. Water-soluble alcohols and ketones and oil-soluble alcohols and ketones boiling up to about 400° F. are substantially unaffected by vapor phase treatment with the basic compound of the aforedescribed conditions. Water-soluble and oil-soluble aldehydes are polymerized to high molecular weight materials which undergo cracking under the conditions of reaction.

An outstanding feature of the subject invention is that hydrolysis of water-soluble and oil-soluble esters is effected in the vapor state. The vapor phase hydrolysis of oil-soluble and water-soluble esters at elevated temperatures over solid basic compounds of the type hereinbefore described, is a surprising and advantageous result of the process of the subject invention.

Another outstanding advantage of the subject invention resides in the fact that the water phase, after separation from the base-treated liquid product and after removal of aqueous azeotropes of the low molecular weight alcohols, ketones and hydrocarbons therefrom, is practically free from acids and other oxygen-containing organic compounds. Consequently, disposal of the water phase does not present a problem since it may be emptied into a river or a stream without fear of causing pollution.

A third advantage of the subject invention results from the fact that a high recovery of oxygen-containing organic compounds in the form of alcohols and ketones is realized.

Alkali metal hydroxides, alkali metal oxides, alkali metal salts, alkaline earth metal hydroxides, alkaline earth metal oxides, alkaline earth metal salts and mixtures thereof are included among the basic compounds which can be employed to effect vapor phase base-treatment of the liquid product obtained by the conversion of carbon monoxide and hydrogen into synthetic fuel. Alkali metals are monovalent elements of the first group of the periodic system; examples are sodium, potassium, lithium, etc.; alkaline earth metals are divalent elements of the second group of the periodic system; examples are calcium, barium, strontium, and the like. Both alkali metal compounds and alkaline earth metal compounds effect vapor phase hydrolysis of oil-soluble and water-soluble esters to alcohols and acids. Basic alkali metal compounds and basic mixtures of alkaline earth and alkali metal compounds decarboxylate oil-soluble and water-soluble acids formed by ester hydrolysis and oil-soluble and water-soluble acids initially present in the liquid product mainly to hydrocarbons; on the other hand, basic alkaline earth metal compounds decarboxylate acids mainly to ketones.

While both basic alkali metal compounds and basic alkaline earth metal compounds effect decarboxylation of acids and hydrolysis of esters in the liquid product and a high degree of the clarification of the water phase of the liquid product, the alkali metal group or mixtures containing alkali metal group of compounds are preferred because they are more efficient. A quicker and more complete treatment of the liquid product can be effected with basic alkali metal compounds than with basic alkaline earth metal compounds. As a consequence, a larger quantity of liquid product can be treated in a unit of time with alkali metal compounds than with alkaline earth metal compounds. Sodium carbonate, sodium phosphate, potassium carbonate, potassium phosphate, potassium borate, sodium hydroxide and potassium hydroxide are examples of basic alkali metal compounds which can be employed in the process of this invention. Sodium carbonate and sodium phosphate are particularly preferred compounds for use in the method of this invention; not only are these compounds particularly active in effecting hydrolysis of esters and decarboxylation of acids, but they are also inexpensive chemicals. Calcium oxide, calcium carbonate, barium oxide, barium carbonate are examples of basic alkaline earth metal compounds used in this invention; calcium oxide and calcium carbonate are preferred basic alkaline earth metal compounds.

Initial separation of the synthesis product into a gas phase, a water phase, and an oil phase is advantageously effected at a temperature of 200 to 400° F. and at a pressure of about 100 to 500 pounds per square inch. As was disclosed in a copending application of F. H. Bruner, G. B. Arnold and H. V. Hess, Serial No. 694,408 filed August 31, 1946 entitled, "Separation of Oxygen-Containing Organic Compounds From Aqueous Mixtures Containing Them," the separation of synthesis product into a gaseous fraction, a water phase and an oil phase at the aforementioned temperature and pressure effects displacement of non-acidic normally water-soluble oxygen-containing compounds, such as, intermediate molecular weight alcohols, esters, aldehydes, and ketones, from the water phase to the oil phase. The main advantage of effecting separation of synthesis product at elevated temperature and pressure resides in the saving in power requirements thereby realized. There is realized a saving in the heat required to fractionate the oil phase into a gasoline fraction and a gas oil fraction and substantial savings are effected in the heat required to vaporize the combined gasoline fraction and water phase. However, the process of this invention is also applicable to a synthesis product, which has been separated into gas, water and oil phases at atmospheric conditions.

The oil phase is fractionated into a gasoline fraction and a residual gas oil fraction after separation of the synthesis product into gas, water and oil phases. Division of the oil phase into gasoline and gas oil fractions can be made at a temperature varying between 350 and 400° F. Advantageously, however, the fractionation is conducted to give a 400° F. E. P. gasoline fraction.

Contacting of the combined gasoline fraction and water phase with a basic material is effected at a temperature between 500 and 1000° F.; it has been found that temperatures between 700 and 950° F. are preferred. It is advisable to employ temperatures in the upper part of the separating range, that is, temperatures of 800 to 1000° F. with alkaline earth metal compounds, whereas temperatures between 700 and 900° F. are advantageous with an alkali metal compound.

Pressures ranging from atmospheric to about 500 pounds per square inch may be employed for the basic treatment of the composite. Atmospheric pressure is ordinarily employed although the use of higher pressures results in smaller equipment. The composite consisting of gasoline fraction and water phase is contacted with a basic compound at a space velocity between about 1 and 10 volumes of liquid product per volume of solid basic material per hour. Space velocities between about 2 and 5 are preferred. As a general proposition, higher space velocities may be employed with alkali metal compounds than with alkaline earth metal compounds.

It is possible to effect the vapor phase contacting of the composite in accordance with any of the usual techniques for catalytic vapor phase contacting. Accordingly, the combined gasoline fraction and aqueous phase can be passed in the vapor state through a fixed bed of solid basic material maintained at a temperature between 500 and 1000° F. or can be contacted with a fluidized bed of basic material particles. The vaporized composite can also be contacted with a moving bed of basic material particles or with a stirred bed of basic material particles.

After treatment with a basic material at a temperature between 500 and 700° F. the combined gasoline fraction and water phase is condensed and separated into a gaseous fraction, a water phase and a gasoline fraction. This separation is also advantageously effected at an elevated temperature of from 200 to 400° F. and a pressure of from 150 to 500 pounds per square inch. As was indicated previously, non-acidic normally water-soluble oxygen-containing organic compounds are displaced from the water phase into the oil phase by such elevated temperature and pressure separation. Water-soluble oxygenated compounds which are predominantly in the form of alcohols after basic treatment are displaced from the water phase to the gasoline fraction by elevated temperature and pressure separation. The advantage of such displacement is that the oxygenate content of the water phase is reduced so that it is easier to obtain a rejectable water by flashing oxygenates therefrom in the form of aqueous azeotropes.

After alcohols and ketones have been separated from the water phase in the form of aqueous azeotropes, the water phase contains less than 0.2 per cent oxygen-containing organic compounds and may be introduced into a river or stream for disposal without fear of polluting them. The gaseous fraction which comprises mainly gaseous hydrocarbons such as ethane, ethylene, propane, etc., and which is of relatively small volume, only comprising up to 4.0 weight per cent of base-treated liquid product, is advantageously recycled to the reaction zone wherein hydrogen and carbon monoxide are converted into synthetic fuel. Alcohols and ketones are readily separated from the gasoline fraction by solvent extraction with a solvent, such as, aqueous methanol, ethylene glycol, diethylene glycol, propylene glycol, furfural, etc. Silica gel adsorption may also be employed to separate alcohols and ketones from the gasoline fraction, but it is ordinarily not employed because of the ease with which separation is effected by solvent extraction.

The effect of contacting the liquid product in the vapor state with a basic material of the described type is illustrated by the substantial increase in alcohol content and substantial decrease in acid and ester content of both the gasoline fraction and water phase after treatment with sodium carbonate at a temperature of approximately 900° F. The gasoline fraction, after separation from the liquid product at atmospheric conditions, had an alcohol content of 4 volume per cent, an acid content of 3 volume per cent and an ester content of 4 volume per cent with minor amounts of aldehydes and ketones whereas the water phase separated from the composite at atmospheric conditions, had an alcohol content of 12 volume per cent, an acid content of 2 volume per cent and an ester content of 3 volume per cent. After the composite comprising gasoline fraction and water phase was contacted with a fixed bed of sodium carbonate at a temperature of about 900° F., a space velocity of 2 volumes of liquid product per volume of solid basic compound per hour and after separation of the base-treated composite into gasoline fraction and water phase at atmospheric conditions, the gasoline fraction had an alcohol content of 7 volume per cent, an acid content of less than 1 volume per cent, and an ester content of less than 1 volume per cent; after the aforementioned treatment the water phase had an alcohol content of 13 volume per cent, an acid content of less than 1 volume per cent, and an ester content of less 1 volume per cent. The decrease in the acid and ester contents of both phases are significant. As has been indicated previously, alcohols and ketones are readily removed from the water phase in the form of aqueous azeotropes by flashing.

In the accompanying figure, there is presented a flow diagram wherein the process of the subject invention is described in detail.

Hydrogen and carbon monoxide are introduced through a pipe 1 into a synthesis reactor 2 wherein conversion of carbon monoxide and hydrogen into liquid hydrocarbons is effected by contact with an iron catalyst maintained in a fluid state at a temperature between 500 and 700° F. and of a pressure between 150 and 500 pounds per square inch.

An effluent comprising unconverted hydrogen and carbon monoxide, carbon dioxide and products of reaction comprising water, gaseous and liquid hydrocarbons, oxygen-containing organic compounds issues from the reactor 2 through a pipe 3 and is introduced into a heat exchange 4 wherein the product is cooled to a temperature between 150 and 400° F. and preferably between a temperature between 200 and 300° F. with no reduction in pressure. Thereafter, the effluent is introduced through a pipe 5 to a separator 7 maintained at a temperature between 150 and 400° F. and preferably between 200 to 300° F. and a pressure between 150 and 500 pounds per square inch. Advantageously, the separator is maintained at approximately the same pressure that is employed for the conversion of carbon monoxide and hydrogen in the reactor 2. In the separator 7 the effluent is separated into a gas phase, a water phase and an oil phase.

Separation of a synthesis product into a gas phase, an oil phase and a water phase at elevated temperature and pressure relieves the load on heat exchange facilities, since the oil phase is immediately converted into a gasoline fraction and a gas oil fraction and the aqueous phase after combination with the gasoline fraction is raised to a temperature of 500 to 1000° F.

The gas phase is withdrawn from the separator 7 through a pipe 9 through which it is recycled to the synthesis reactor 2 so that a recycle ratio of recycle gas to fresh feed between about 1 to 1 and 5 to 1 is maintained. A drawoff pipe 10 affords means of withdrawing that portion of the gas phase which is not recycled.

The oil phase is withdrawn from the separator 7 through a pipe 11 and is introduced into a fractionating tower 12 wherein the oil phase is separated into a gasoline fraction and a residual gas oil fraction by fraction distillation. Division of the oil phase into gasoline fraction and a gas oil fraction is ordinarily effected at a temperature between 350 and 400° F. with the latter temperature being most commonly employed as the division temperatures between the two fractions. Gasoline fraction having an E. P. of about 400° F. is taken off overhead from the fractionating tower 12 through a pipe 13. Residual gas oil fraction is withdrawn from the bottom of the tower 12 through a pipe 14.

Water phase is withdrawn from the separator 7 through a pipe 16 and combines with the gasoline fraction flowing through the pipe 13. The composite of water phase and gasoline fraction is raised to a temperature between 500 and 1000° F. in the heat exchanger 18 and is thereafter introduced into a base treater 20 through a pipe 19; base treater 20 contains a basic material of the type heretofore described and is maintained at a temperature between 500 and 1000° F. and at atmospheric pressure.

The combined gasoline fraction and water phase contacts in the base treater 20 a basic compound of an alkali metal, an alkaline earth metal or a mixture of such compounds. For purposes of description, it will be assumed that the base treater 20 contains an alkali metal salt such as sodium carbonate. The basic treatment of the composite in the vapor state with sodium carbonate hydrolyzes the esters to alcohols and acids and decarboxylates the acids initially present together with those formed by ester hydrolysis to hydrocarbons.

The water-soluble and oil-soluble aldehydes are polymerized by vapor phase contacting with sodium carbonate to high molecular weight compounds which are partially cracked to smaller molecular weight hydrocarbons. The oil-soluble and water-soluble alcohols and ketones are substantially unaffected with the exception that the alcohol content is substantially increased by ester hydrolysis.

The base-treated composite with its acid, ester and aldehyde content substantially reduced but with an increased content of alcohols and hydrocarbons, is introduced through a pipe 23 into heat exchanger 26 wherein it is cooled to a temperature between 150 and 400° F. and preferably to approximately 250° F. The base-treated composite is then introduced through a pipe 27 into a separator 30 wherein it is separated into a gaseous fraction, a gasoline fraction and a water phase at elevated temperature and pressure.

Separation of the base-treated composite into a gasoline fraction and water phase at an elevated pressure between 150 and 500 pounds per square inch and at an elevated temperature of 150 to 400° F. effects displacement of alcohols and ketones normally soluble in the water phase into the oil phase. The gaseous fraction comprising a relatively small amount of gaseous hydrocarbons such as, ethane, butenes, butanes, etc., is withdrawn from the separator 30 through a pipe 31 through which it is recycled to the reaction zone. The pipe 31 leads into the pipe 1 through which the gas phase originally separated from the synthesis product is recycled to the synthesis reactor 2.

The gasoline fraction is withdrawn from the separator 30 through a pipe 33. Oxygenated compounds, which are predominantly alcohols, although there are minor portions of ketones present in the gasoline fraction, are simply extracted from the gasoline fraction with a gasoline-immiscible solvent, such as aqueous methanol, ethylene glycol, poly glycols, and furfural.

The gasoline fraction obtained in the aforedescribed manner has an alcohol content of 7 volume per cent, a combined acid and ester content of less than 1 volume per cent and a ketone content of 1 volume per cent. The high alcohol content and the low ester and acid contents of the gasoline fraction are significant.

The water phase is withdrawn from the separator 30 through a pipe 40 and is introduced therethrough to a flash tower 41. Aqueous azeotropes of alcohols, ketones and hydrocarbons are removed from the flash tower 41 through a pipe 42. Thereafter, the azeotropes may be further separated into individual constituents. The reject water obtained from the flash tower 41 through a draw-off pipe 43 has an alcohol content less than 1.0 volume per cent, and a combined acid and ester content of less than 1 volume per cent. The water phase thus substantially free from organic compounds, may be rejected through the pipe 43 and poured into a nearby body of water without danger of polluting same.

It will be understood that the foregoing detailed description is merely illustrative of the process of the invention and is not intended as any limitation thereon. The synthesis product can be cooled and separated into a gas phase, a water phase and an oil phase at atmospheric conditions rather than at elevated temperature and pressure in the detailed description prior to contacting the combined gasoline fraction and water phase in the vapor phase with a basic compound. Moreover, it is also possible to separate the base-treated composite into a gaseous fraction, a water phase and a gasoline fraction at atmospheric conditions rather than at elevated temperature and superatmospheric pressure as in the detailed description.

As has been indicated previously, a basic alkaline earth metal compound, such as calcium oxide, or mixtures of basic alkali metal compounds and alkaline earth metal compounds can be employed for the vapor phase treatment of the liquid synthesis product. The use of a basic alkaline earth metal compound increases the ketone content of the liquid product by decarboxylation of acids to ketones.

Obviously, many modifications and variations of the invention as hereinbefore set forth may be made without departing from the spirit and scope thereof, and therefore only such limitations should be imposed as are indicated in the appended claims.

We claim:

1. A process for treating a product containing water, hydrocarbons and oxygen-containing organic compounds comprising alcohols, esters, acids, aldehydes and ketones, and which is obtained by the catalytic conversion of carbon monoxide and hydrogen into synthetic fuel, which comprises separating said product into a gas phase, a water phase and an oil phase, fractionating said oil phase into a gasoline fraction and a gas oil fraction, combining said water phase with said gasoline fraction to form a composite phase consisting of said gasoline fraction and said water phase vaporizing said composite phase, contacting said composite in the vapor state at a temperature of 500 to 1000° F. with a solid basic material selected from the group consisting of alkali metal compounds, alkaline earth compounds and mixtures thereof whereby esters are hydrolyzed and acids are decarboxylated, separating said composite into a gaseous fraction, a water phase and a gasoline fraction, separately removing alcohols and ketones from said water phase and said gasoline fraction.

2. A process according to claim 1 in which the composite is contacted with a basic material at a temperature of 700 to 950° F.

3. A process according to claim 1 in which the catalytic conversion of carbon monoxide and hydrogen into synthetic fuel is effected by contact with an iron catalyst at a temperature of about 500 to 700° F. and at a pressure of from 100 to 500 pounds per square inch.

4. A process according to claim 1 in which the vaporized composite is contacted in the vapor state with a basic alkali metal compound.

5. A process according to claim 1 in which the vaporized composite is contacted with sodium carbonate.

6. A process according to claim 1 in which the separation of synthesis product into a gas phase, a water phase and an oil phase is effected at a temperature of about 150 to 400° F. and at elevated pressure.

7. A process according to claim 1 in which the base-treated composite is separated into a gaseous fraction, a water fraction and a gasoline fraction at an elevated temperature of 150 to 400° F. and at elevated pressure.

8. A process according to claim 1 in which the base-treated composite is separated into a gaseous fraction, a water fraction and a gasoline at atmospheric conditions.

9. A process according to claim 1 in which the gaseous fraction separated from the base-treated composite is recycled to the synthesis reaction.

HOWARD V. HESS.
GEORGE B. ARNOLD.
MARVIN L. DRABKIN.

REFERENCES CITED

The following references are of record in the file of this patent:

UNITED STATES PATENTS

| Number | Name | Date |
|---|---|---|
| 1,979,303 | Woodhouse | Nov. 6, 1934 |
| 2,076,607 | Woodhouse | Apr. 13, 1937 |
| 2,452,121 | Grahame | Oct. 26, 1948 |